US009569796B2

(12) United States Patent
Wang et al.

(10) Patent No.: US 9,569,796 B2
(45) Date of Patent: *Feb. 14, 2017

(54) CLASSIFYING OPEN-LOOP AND CLOSED-LOOP PAYMENT CARDS BASED ON OPTICAL CHARACTER RECOGNITION

(71) Applicant: GOOGLE INC., Mountain View, CA (US)

(72) Inventors: Xiaohang Wang, Jersey City, NJ (US); Glenn Berntson, Jersey City, NJ (US)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/139,295

(22) Filed: Apr. 26, 2016

(65) Prior Publication Data

US 2016/0239911 A1   Aug. 18, 2016

Related U.S. Application Data

(63) Continuation of application No. 14/551,883, filed on Nov. 24, 2014, now Pat. No. 9,342,830.

(Continued)

(51) Int. Cl.
*G06Q 20/34* (2012.01)
*G06Q 40/00* (2012.01)
(Continued)

(52) U.S. Cl.
CPC ........... *G06Q 40/00* (2013.01); *G06K 9/00442* (2013.01); *G06K 9/18* (2013.01);
(Continued)

(58) Field of Classification Search
CPC .................................................... G06Q 20/34
See application file for complete search history.

(56) References Cited

U.S. PATENT DOCUMENTS 6,722,574 B2   4/2004 Skantze et al.
8,644,611 B2   2/2014 Natarajan et al.
(Continued)

FOREIGN PATENT DOCUMENTS

AU   2013100314 A4   4/2013
WO   2014/210576 A2   12/2014

OTHER PUBLICATIONS

Datta, "Credit Card Processing Using Cell Phone Images", Jan. 1, 2011, 7 pages.
(Continued)

*Primary Examiner* — Christle I Marshall
(74) *Attorney, Agent, or Firm* — Johnson, Marcou & Isaacs, LLC

(57) ABSTRACT

A user captures an image of a payment card via a user computing device camera. An optical character recognition system receives the payment card image from the user computing device. The system performs optical character recognition and visual object recognition algorithms on the payment card image to extract text and visual objects from the payment card image, which are used by the system to identify a payment card type. The system may categorize the payment card as an open-loop card or a closed-loop card, or as a credit card or a non-credit card. In an example embodiment, the system allows or prohibits extracted financial account information from the payment card to be saved in the digital wallet account based on the determined payment card category. In another example embodiment, the system transmits an advisement to the user based on the determined payment card category.

20 Claims, 6 Drawing Sheets

Related U.S. Application Data

(60) Provisional application No. 62/024,838, filed on Jul. 15, 2014.

(51) Int. Cl.
    *G06K 9/00* (2006.01)
    *G06K 9/18* (2006.01)
    *G06Q 20/36* (2012.01)
    *G06K 9/32* (2006.01)
    *H04N 5/225* (2006.01)

(52) U.S. Cl.
    CPC ........... *G06K 9/3258* (2013.01); *G06Q 20/34* (2013.01); *G06Q 20/351* (2013.01); *G06Q 20/36* (2013.01); *H04N 5/2257* (2013.01); *G06K 2209/01* (2013.01)

(56) References Cited

U.S. PATENT DOCUMENTS

| | | |
|---|---|---|
| 8,831,329 B1 | 9/2014 | Kumar et al. |
| 8,942,420 B2 | 1/2015 | Kim et al. |
| 8,995,741 B2 | 3/2015 | Kumar et al. |
| 9,070,183 B2 | 6/2015 | Kumar et al. |
| 9,213,907 B2 | 12/2015 | Kumar et al. |
| 9,235,771 B2 | 1/2016 | Rowley et al. |
| 9,262,682 B2 | 2/2016 | Kumar et al. |
| 9,342,830 B2 | 5/2016 | Wang et al. |
| 2004/0057619 A1 | 3/2004 | Lim et al. |
| 2004/0117302 A1 | 6/2004 | Weichert et al. |
| 2006/0230004 A1 | 10/2006 | Handley |
| 2006/0251338 A1 | 11/2006 | Gokturk et al. |
| 2007/0142035 A1 | 6/2007 | Lee |
| 2008/0056572 A1 | 3/2008 | Nielsen |
| 2008/0143880 A1 | 6/2008 | Jung et al. |
| 2008/0177730 A1 | 7/2008 | Endo et al. |
| 2008/0298635 A1 | 12/2008 | West |
| 2009/0028443 A1 | 1/2009 | Chen et al. |
| 2009/0060396 A1 | 3/2009 | Blessan et al. |
| 2010/0054585 A1 | 3/2010 | Guillou et al. |
| 2010/0310172 A1 | 12/2010 | Natarajan et al. |
| 2011/0170768 A1 | 7/2011 | Alldrin et al. |
| 2012/0099780 A1 | 4/2012 | Smith et al. |
| 2012/0143760 A1 | 6/2012 | Abulafia et al. |
| 2012/0233073 A1 | 9/2012 | Salmon et al. |
| 2012/0239542 A1 | 9/2012 | Preston et al. |
| 2013/0004076 A1 | 1/2013 | Koo et al. |
| 2013/0060786 A1 | 3/2013 | Serrano et al. |
| 2013/0100314 A1 | 4/2013 | Li et al. |
| 2013/0114890 A1 | 5/2013 | Saund |
| 2013/0179245 A1 | 7/2013 | Simonoff |
| 2013/0182909 A1 | 7/2013 | Rodriguez-Serrano |
| 2013/0195376 A1 | 8/2013 | Baheti et al. |
| 2014/0043492 A1 | 2/2014 | Geiger et al. |
| 2014/0122479 A1 | 5/2014 | Panferov et al. |
| 2014/0244493 A1 | 8/2014 | Kenyon et al. |
| 2014/0334721 A1 | 11/2014 | Cervin et al. |
| 2015/0110362 A1 | 4/2015 | Amtrup et al. |
| 2015/0127476 A1 | 5/2015 | Skiba et al. |
| 2015/0254519 A1 | 9/2015 | Kumar et al. |
| 2015/0294437 A1 | 10/2015 | Manno et al. |
| 2016/0019529 A1* | 1/2016 | Wang ................ G06K 9/00442 705/41 |
| 2016/0019530 A1 | 1/2016 | Wang et al. |
| 2016/0063325 A1 | 3/2016 | Kumar et al. |

OTHER PUBLICATIONS

Jacob, "Identification Numbers and Check Digit Algorithms", Sep. 20, 2012, 11 pages. Webpage: http://www.codeproject.com/Articles/459507/Identification-numbers-and-check-digit-algorithms%201-11.

Mohri, International Preliminary Report on Patentability issued in International Application No. PCT/US2014/044757, mailed on Jan. 7, 2016, 11 pages.

Sommermeyer, International Search Report and Written Opinion issued in International Application No. PCT/US2014/044757, mailed on May 29, 2015, 16 pages.

Arica, et al., "Optical Character Recognition for Cursive Handwriting", IEEE, Transactions on Pattern Analysis and Machine Intelligence, vol. 24, No. 6, Jun. 2002, pp. 801-813.

Hossain, et al., "Rapid Feature Extraction for Optical Character Recognition", aRXiv, 1206.0238v1, Jun. 4, 2012, 5 pages.

Baran, et al., "transOptic, an Android OCR System", 18-551 Digital Communications & Signal Processing System Deign, Spring 2012, May 9, 2012, 36 pages.

Google Inc., "TVCG Submission—Video Snapshots: Creating High-Quality Images from Video Clips", retrieved from web on Nov. 14, 2013, 17 pages. webpage: http://www.eecs.harvard.edu/~kalyans/research/snapshots/supplementary/results.html.

Patel, U.S. Office Action issued in copending U.S. Appl. No. 14/059,071, filed Oct. 21, 2013, mailed on Feb. 25, 2015, 12 pages.

Desire, U.S. Office Action issued in copending U.S. Appl. No. 14/059,151, filed Oct. 21, 2013, mailed on Jan. 13, 2014, 10 pages.

Desire, U.S. Office Action issued in copending U.S. Appl. No. 14/461,001, filed Aug. 15, 2014, mailed on Oct. 2, 2014, 6 pages.

Stanford, U.S. Office Action issued in copending U.S. Appl. No. 14/551,991, filed Apr. 26, 2016, mailed on Aug. 7, 2015, 14 pages.

Stanford, U.S. Office Action issued in copending U.S. Appl. No. 14/551,991, filed Apr. 26, 2016, mailed on Dec. 7, 2015, 16 pages.

Stanford, U.S. Office Action issued in copending U.S. Appl. No. 14/551,991, filed Apr. 26, 2016, mailed on May 5, 2016, 24 pages.

Desire, U.S. Office Action issued in copending U.S. Appl. No. 14/645,410, filed Mar. 11, 2015, mailed on May 7, 2015, 7 pages.

Google Inc., "Understanding Optical Character Recognition (OCR)", retrieved from web on Nov. 8, 2013, 7 pages.

* cited by examiner

CLASSIFYING OPEN-LOOP AND CLOSED-LOOP PAYMENT CARDS BASED ON OPTICAL CHARACTER RECOGNITION

RELATED APPLICATION

This patent application is a continuation of U.S. application Ser. No. 14/551,883 filed Nov. 24, 2014 and entitled "Classifying Open-Loop And Closed-Loop Payment Cards Based On Optical Character Recognition," which claims priority under 35 U.S.C. §119 to U.S. Patent Application No. 62/024,838, filed Jul. 15, 2014, and entitled "Categorizing Payment Cards Based on Optical Character Recognization of Images of the Payment Cards." The entire contents of the above-identified applications are hereby fully incorporated herein by reference.

TECHNICAL FIELD

The present disclosure relates generally to improving the process for categorizing payment cards based on optical character recognition of images of the cards.

BACKGROUND

User computing device applications can be used to store payment information associated with payment cards for use in transactions. Closed-loop payment cards, such as merchant gift cards, can only be used for purchases at a specific merchant, while open-loop payment cards, such as credit cards or debit cards, can be used at multiple merchants. Generally, showing financial account information for closed-loop payment cards on user computing device applications does not present any security concerns since a closed-loop payment card can only be used at one merchant. However, showing complete financial account information associated with open-loop payment cards on user computing device applications presents a security risk to a user because many open-loop cards are associated with personal credit accounts and bank accounts of users. Many open-loop cards have standardized designs since they are usable at multiple merchants.

SUMMARY

In certain example aspects described herein, computer-implemented methods to categorize payment information as open-loop or closed-loop for saving in a digital wallet based on optical text recognition and object recognition of captured images of payment cards is provided. In an example embodiment, an optical character recognition ("OCR") system receives a payment card image from a user computing device and performs OCR and visual object recognition algorithms on the payment card image to extract text and visual objects from the payment card image. For each of the extracted visual objects, the OCR system retrieves a corresponding text description and, based on the extracted text and text descriptions of extracted visual objects, the OCR system identifies a payment card type. The OCR system categorizes the payment card as an open-loop card or a closed-loop card. In an example embodiment, the OCR system allows or prohibits extracted financial account information from the payment card to be saved in the digital wallet account based on the determined payment card category. In another example embodiment, the OCR system transmits an advisement to the user based on the determined payment card category.

In certain other example aspects described herein, systems and computer program products to categorize payment information as open-loop or closed-loop for saving in a digital wallet based on optical text recognition and object recognition of captured images of payment cards are provided.

These and other aspects, objects, features, and advantages of the example embodiments will become apparent to those having ordinary skill in the art upon consideration of the following detailed description of illustrated example embodiments.

DETAILED DESCRIPTION OF EXAMPLE EMBODIMENTS

Overview

Figure 1:
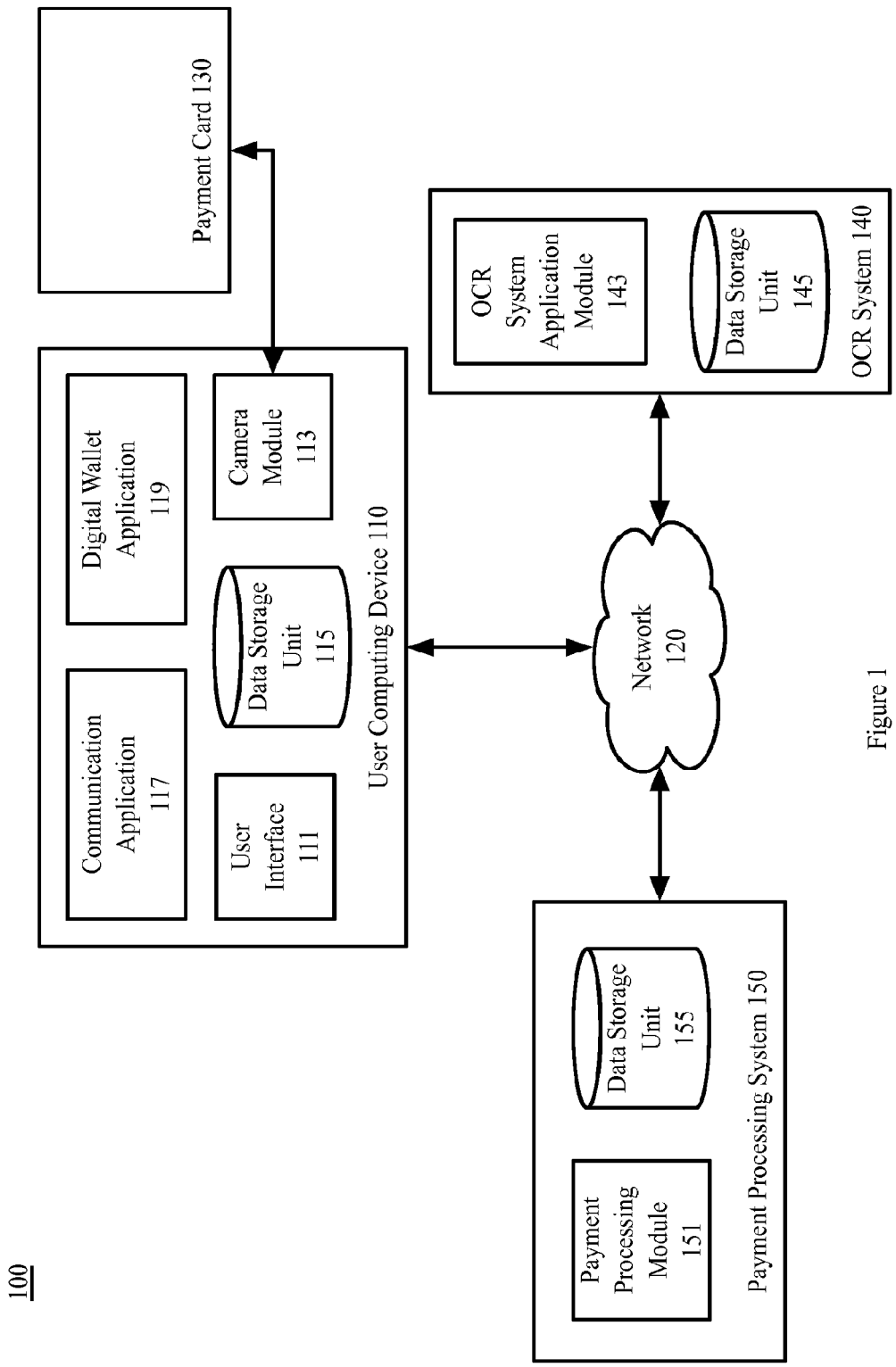
FIG. 1 is a block diagram depicting a system for categorizing payment information as open-loop or closed-loop for saving in a digital wallet based on optical text recognition and object recognition of captured images of payment cards, in accordance with certain example embodiments.

The example embodiments described herein provide computer-implemented techniques for categorizing payment information as open-loop or closed-loop for saving in a digital wallet based on optical text recognition and object recognition of captured images of payment cards. In an example embodiment, a user captures an image of a payment card via a user computing device camera. An optical character recognition ("OCR") system receives the payment card image from the user computing device. The OCR system performs OCR and visual object recognition algorithms on the payment card image to extract text and visual objects from the payment card image. For each of the extracted visual objects, the OCR system retrieves a corresponding text description. Based on the extracted text and text descriptions of extracted visual objects, the OCR system identifies a payment card type. In an example embodiment, the OCR system categorizes the payment card as an open-loop card or a closed-loop card. In an example embodiment, the OCR system allows or prohibits extracted financial account information from the payment card to be saved in the digital wallet account based on the determined payment card category. In another example embodiment, the OCR system transmits an advisement to the user based on the determined payment card category.

In an example embodiment, a user selects a digital wallet application on a user computing device. The digital wallet application on the user computing device is associated with a payment processing system and communicates with the payment processing system. In this example, the user may register with the payment processing system to create a digital wallet account and may download the digital wallet application onto the user computing device. In an example embodiment, the digital wallet application stores payment account information associated with the user for use in transactions. The user selects an option to add a new payment card to the digital wallet application. An example payment card comprises a credit card, a debit card, a stored value card or other gift card, a coupon, a voucher card, a rewards points card, a loyalty card, or other card appropriate for use in a transaction. In this example, a transaction may comprise a purchase, exchange, return, or redemption of goods or services and may comprise transfers of funds, credits, points, or any other appropriate unit of value to or from a user financial account associated with a corresponding payment card.

The user computing device camera module is activated. In an example embodiment, the digital wallet application activates a camera module resident on the user computing device in response to the user selecting an option to add a new payment card to the digital wallet application. In this example embodiment, the camera module communicates with the user computing device, which comprises a camera device. In another example embodiment, a camera device is separate from the user computing device and communicates with the user computing device over a network. In another example embodiment, the user activates the camera module manually by actuating an object on the user interface of the user computing device. The user captures an image of the payment card. In an example embodiment, the user actuates an interface object on the user computing device to capture the image of the payment card. In this example embodiment, the user captures an image of the front side of the payment card, an image of the back side of the payment card, or multiple images of both the front side and the back side of the payment card. For example, the digital wallet application displays a live stream of the camera feed to enable the user to aim the camera module or camera device to capture an adequate image of the payment card. In this example, the user positions the payment card and/or the user computing device within a viewing area displayed by the user computing device and actuates an object on the user interface to capture the image of the payment card. For example, the user touches a "take picture" interface object on a touch screen interface of the user computing device to take a picture of the payment card. In another example embodiment, the user captures multiple images of the payment card and the digital wallet application selects one of the multiple images.

The image or images of the payment card are transmitted by the user computing device to an optical character recognition ("OCR") system. In an example embodiment, some, or all, of the functions of the OCR system may be performed by an OCR system application module. In another example embodiment, some or all of the functions attributed to as being performed by the OCR system may be performed by the user computing device. For example, instead of transmitting the captured image of the payment card to the OCR system, the user computing device may perform character and image recognition on the captured image. In an example embodiment, the OCR system application module, the user computing device camera module, the user computing device, or other computing device performs blur detection on the image. For example, the image may be recognized as blurry, overly bright, overly dark, or otherwise obscured in a manner that prevents a high resolution image from being obtained. In this example embodiment, the appropriate device may adjust the image capturing method to reduce the blur in the image. For example, the OCR system may transmit a request to the user computing device instructing the camera module to adjust the focus on the payment card, instructing the user to move the camera device or user computing device comprising a camera device closer to or farther away from the payment card, or any other appropriate instruction. In this example, the user captures a subsequent image of the payment card using the user computing device or camera device and the user computing device transmits the subsequent image to the OCR system. In another example, the user computing device, digital wallet application residing on the user computing device, or camera module residing on the user computing device may request that the camera module and/or the user perform similar actions to receive a subsequent image to transmit to the OCR system.

In another example embodiment, the OCR system application module may perform a digital image manipulation or any other suitable method to remove a blur in the image. In an example embodiment, the OCR system application module isolates the image of the payment card from the received image using image data manipulation or image extraction techniques. For example, the received image may comprise an image of a payment card taken on the background of a kitchen table. In this example, the OCR system application module isolates and extracts the image of the payment card from the background image of the table to create an image comprising only the payment card. In some example embodiments, the OCR system application module received images comprising images of the front and back of the payment card. In these example embodiments, the OCR system application module may isolate and extract the images of the front and back sides of the payment card to create a combined image comprising only the payment card.

The OCR system extracts alphanumeric text from the image of the payment card. In an example embodiment, the OCR system application module applies an OCR algorithm to the card image to identify the information on the card. The OCR algorithm may represent any suitable process, program, method, or other manner of recognizing the digits or characters represented on the card image. In an example embodiment, the OCR algorithm may be customized to look for characters in particular locations on the image of the payment card, to look for a certain number of characters, or to look for certain combinations of characters. For example, it may be an industry standard for certain types of payment cards to have 15 or 16 numerical digits in a certain location on the payment card. In an example embodiment, the OCR system application module identifies each character and categorizes the groups of characters. For example, the OCR system application module may determine that a group of characters comprise a name, account number, expiration date, and other suitable categories of data.

The OCR system extracts visual objects from the image of the payment card. The OCR system application module may use any suitable algorithm, process, method, or other manner of recognizing card images. For example, the OCR system application module may isolate visual objects, such as card art, within the image of the card and can compare the visual object images to a stored database of images to identify matching images. The OCR system retrieves a text description of extracted visual objects. For example, when the OCR system compares the identified visual object to a database of images and locates a matching image, the OCR system accesses stored data associated with the matching image. The data stored with the matching images may include an identification of the payment card type. For example, the OCR system may identify a logo on the card image that matches a logo in the database and retrieve a text description from the database that identifies the logo as pertaining to a particular bank, merchant system, issuer system, acquirer system, or other appropriate system.

The OCR system identifies the payment card as either an open-loop payment card or a closed-loop payment card based on the extracted text and the retrieved text description of extracted visual objects in the image of the payment card. For example, an open-loop payment card is a payment card that can be used in transactions with multiple merchant systems, for example, a credit card, a debit card, or a universal gift card issued by a credit card system. A closed-loop payment card is a payment card that can be used in transactions with one merchant system only or with a limited number of merchants. In certain example embodiments, the digital wallet application is configured to save closed-loop payment card information in the digital wallet application, but not to save open-loop payment card information due to user security concerns or open-loop display requirements.

In certain example embodiments described herein, if the OCR system identifies the payment card as an open-loop card, the OCR system transmits a notification to the digital wallet application on the user computing device that the payment card is an open-loop card. In these example embodiments, the user computing device notifies the user that the payment card is not savable in the digital wallet application. For example, the user computing device displays a message on the user interface that says "debit/credit/universal gift cards/etc. are not savable on this application. Please try a different card." In these example embodiments, if the OCR system identifies the payment card as a closed-loop payment card, the OCR system application module transmits payment information associated with the payment card (for example, information captured from the image of the card) to the digital wallet application on the user computing device. In this example, the digital wallet application saves the closed-loop payment card information on the user computing device.

In certain example embodiments, the digital wallet application does not save open-loop payment cards and in other example embodiments, exclusion of open-loop payment cards is not performed. In other example embodiments, open-loop cards are savable to the digital wallet application, and the OCR system does not differentiate in treatment of the payment card types. In these example embodiments, once payment information is obtained for a payment card, the payment information is transmitted to the digital wallet application for saving on the user computing device by the digital wallet application. In an example embodiment, saving the payment card information comprises saving the image of the payment card and any information necessary or useful to conduct a digital wallet transaction with the saved payment card. In certain example embodiments, the OCR system identifies the merchant system, financial institution, issuer system, and/or acquirer system associated with the payment card. In certain example embodiments, the OCR system identifies a type for an open-loop card. For example, the OCR system identifies an open-loop card as a credit card, a debit card, a universal gift card associated with a credit card system, or another open-loop card type.

In certain example embodiments, the user initiates a digital wallet transaction. For example, the user accesses a website associated with a peer to peer transaction system using the user computing device, selects another user with whom to initiate a payment transfer, and selects an amount to transfer. In another example embodiment, the user initiates a transaction with a merchant system point of sale ("POS") system at a physical store location. In an example embodiment, the user selects an option to pay using the digital wallet application. The digital wallet application presents the user with a list of saved payment cards, the saved payment cards comprising saved images of payment cards captured by the user computing device camera module or other capture device. In an example embodiment, the user is presented with images of each of the payment cards in the payment card list for selection. For example, the list of saved payment cards may comprise one or multiple debit cards, credit cards, loyalty cards, rewards cards, coupon cards, gift cards or other stored value cards, or other payment cards entered by the user, depending on the configurations of the digital wallet application.

The user selects a payment card from the digital wallet account. In an example embodiment, the user actuates an object on the user interface of the user computing device to select the payment card from one or more payment cards stored on in the user's 101 digital wallet account. For example, the user touches an image of the payment card on a touchscreen user interface to select the payment card. In this example, the user may select an option on the digital wallet application to capture the image of the payment card. In an example embodiment, the digital wallet application transmits one or multiple saved or captured images associated with the selected payment card to the OCR system application module for text and image recognition. In another example embodiment, the digital wallet application has previously sent an image of the payment card to the OCR system and received payment information associated with the payment card image from the OCR system. The transaction is processed. For example, a payment processing system associated with the user's digital wallet account processes the transaction by communicating with a credit card network or a financial institution system associated with the payment card selected by the user for use in the transaction.

By using and relying on the methods and systems described herein, an OCR system may categorize payment cards as open-loop or closed-loop for saving in a digital wallet account based optical text recognition and object recognition of captured images of payment cards. Additionally, by receiving a categorization of the payment cards from the OCR system, a payment processing system associated with a digital wallet account to which a user is attempting to upload the payment cards may improve the security of the user's financial information by not displaying payment information or not saving payment card information associated with a certain category.

Example System Architecture

Turning now to the drawings, in which like numerals indicate like (but not necessarily identical) elements throughout the figures, example embodiments are described in detail.

FIG. 1 is a block diagram depicting a system 100 for identifying payment cards via object recognition and optical text recognition of payment card images, in accordance with certain example embodiments. As depicted in FIG. 1, the system 100 includes network computing systems 110 and 140 that are configured to communicate with one another via one or more networks 120. In some embodiments, a user associated with a device must install an application and/or make a feature selection to obtain the benefits of the techniques described herein.

The network 120 can include a local area network ("LAN"), a wide area network ("WAN"), an intranet, an Internet, storage area network ("SAN"), personal area network ("PAN"), a metropolitan area network ("MAN"), a wireless local area network ("WLAN"), a virtual private network ("VPN"), a cellular or other mobile communication network, Bluetooth, Bluetooth low energy, near field communication ("NFC"), Wi-Fi, or any combination thereof or any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network computing device 110 and 140 includes a device having a communication module capable of transmitting and receiving data over the network 120. For example, each network computing device 110 and 140 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network computing devices 110 and 140 are operated by users and OCR system operators, respectively.

An example user computing device 110 comprises a user interface 111, a camera module 113, a data storage unit 115, a communication application 117, and a digital wallet application 119.

In an example embodiment, the user interface 111 enables the user 101 to interact with the digital wallet application 119. For example, the user interface 119 may be a touch screen, a voice-based interface or any other interface that allows the user 101 to provide input and receive output from an application or module on the user computing device 110.

In an example embodiment, the camera module 113 comprises any module or function of the user computing device 110 that obtains a digital image. In other example embodiments, a camera device obtains or captures a digital image and transmits the image to the user computing device 110. The camera module 113 may be onboard the user computing device 110 or in any manner logically connected to the user computing device 110. The camera module 113 may be capable of obtaining individual images or a video scan. Any other suitable image capturing device may be represented by the camera module 113. In an example embodiment, the camera module 113 may control an associated camera device to capture an image or record a video of a payment card 130. In an example embodiment, the camera module 113 communicates with the digital wallet application 119 and/or the OCR system 140 to transmit the captured image of the payment card 130.

In an example embodiment, the data storage unit 115 comprises a local or remote data storage structure accessible to the user computing device 110 suitable for storing information. In an example embodiment, the data storage unit 115 stores encrypted information, such as HTML5 local storage. In an example embodiment, the data storage unit 115 stores financial account information associated with one or more payment cards 130 for use by the digital wallet application 119.

In an example embodiment, the user 101 can use a communication application 113, such as a web browser 114 application or a stand-alone shopping application 116, to view, download, upload, or otherwise access documents or web pages via a distributed network 120. In an example embodiment, the communication application 113 can interact with web servers or other computing devices connected to the network 120, including the user computing device 110 and a web server 143 associated with an OCR system 140.

In an example embodiment, the digital wallet application 119 is a program, function, routine, applet, or similar entity that exists on and performs its operations on the user computing device 110. In certain embodiments, the user 101 must install the digital wallet application 119 and/or make a feature selection on the user computing device 110 to obtain the benefits of the techniques described herein. In an example embodiment, the user 101 may access the digital wallet application 119 on the user computing device 110 via the user interface 111. In an example embodiment, the digital wallet application 119 can be selected by a user on the user computing device 110 and used to initiate a peer to peer transaction by a user. In another example embodiment, the digital wallet application 119 may be used in an online transaction by the user with a merchant system. In an example embodiment, the digital wallet application 119 is associated with a payment processing system 150 and communicates with the payment processing system 150. In an example embodiment, the digital wallet application 119 communicates with an online digital wallet account managed by the payment processing module 151.

In certain example embodiments, one or more functions herein described as performed by the digital wallet application 119 may also be performed by the OCR system application module 143 associated with an OCR system 140. In certain example embodiments, one or more functions herein described as performed by the digital wallet application 119 may also be performed by the user computing device 110 operating system or a web browser application executing on the user computing device 110.

In an example embodiment, the user computing device 110 communicates with the OCR system 140 via the network 120.

An example OCR system 140 comprises an OCR system application module 143 and a data storage unit 145.

In an example embodiment, the OCR system application module 143 performs the functions of optical character recognition ("OCR") and visual object recognition for the OCR system 140. For example, OCR may comprise recognition of numbers, letters, symbols, and other characters on a payment card image and visual object recognition may comprise computer recognition of a logo on the payment card image. Visual object recognition may comprise recognition of logos associated with a payment card image. In an example embodiment, the OCR system comprises a database that is used to match extracted visual objects with a corresponding text description of the visual objects and retrieve the text descriptions. In an example embodiment, the OCR system 140 categorizes the payment card 130 based on OCR and visual object recognition. In an example, the OCR system 140 categorizes the payment card 130 as an open-loop payment card 130 or a closed-loop payment card 130. In another example, the OCR system 140 categorizes the payment card 130 as a credit payment card 130 or a non-credit payment card 130.

In an example embodiment, the data storage unit 145 comprises a local or remote data storage structure accessible to the OCR system 140 and/or OCR system application module 143 suitable for storing information. In an example embodiment, the data storage unit 145 stores encrypted information, such as HTML5 local storage. In an example embodiment, the data storage unit 145 is resident on the OCR system application module 143.

An example payment processing system 150 comprises a payment processing module 151 and a data storage unit 155.

In an example embodiment, the payment processing module 151 processes a transaction initiated by a user using financial account information associated with a digital wallet account. In an example embodiment, the payment processing module 151 accesses financial account information selected by the user from the digital wallet account for use in the transaction. For example, the payment processing module 151 may receive a notification of a selection of the payment card from the user computing device 110 over the network 120 and may access the data storage unit 155 to retrieve financial account information associated with the payment card 130 selected by the user. In an example embodiment, the payment processing module communicates with a credit card processing system or a financial institution system over the network 120 to process the transaction. An example credit card processing system may comprise an issuer system and an acquirer system associated with a user credit card selected by the user for use in the transaction. An example financial institution system comprises a bank that is associated with a debit card selected by the user for use in the transaction. In an example embodiment, the payment processing module 151 generates a receipt and transmits the receipt to the user computing device 110. An example receipt may comprise a transaction summary comprising a list of the items purchased, a total amount for the transaction, the payment instrument used, the user's name, and/or other relevant or useful information associated with the transaction. In another example, the transaction is unsuccessful and the receipt comprises a statement that the transaction could not be completed or that the transaction has been canceled.

In an example embodiment, the data storage unit 155 comprises a local or remote data storage structure accessible to the payment processing system 150 suitable for storing information. In an example embodiment, the data storage unit 155 stores encrypted information, such as HTML5 local storage. In an example embodiment, the data storage unit 155 stores financial account information associated with one or more payment cards 130 in a digital wallet account associated with a user. In an example embodiment, the payment processing system 150 receives the financial account information associated with the one or more payment cards from the OCR system 140. For example, the OCR system 140 analyzes one or more images of one or more payment cards 130 received from a user computing device 110 and extracts financial account information from the one or more images.

It will be appreciated that the network connections shown are example and other means of establishing a communications link between the computers and devices can be used. Additionally, those having ordinary skill in the art having the benefit of the present disclosure will appreciate that the user computing device 110 and the OCR system 140 illustrated in FIG. 1 can have any of several other suitable computer system configurations. For example, a user computing device 110 embodied as a mobile phone or handheld computer may or may not include all the components described above.

Figure 6:
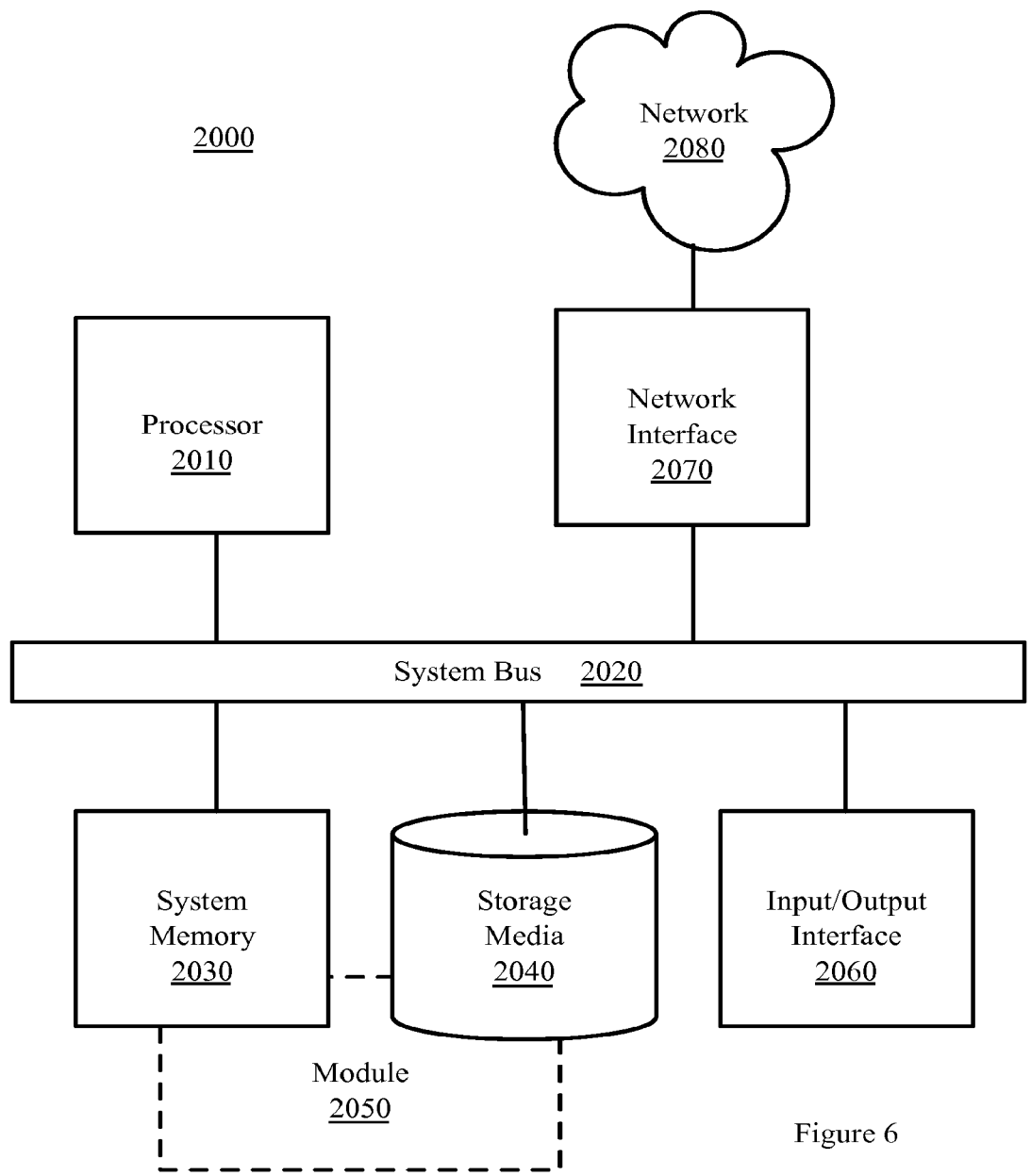
FIG. 6 is a block diagram depicting a computing machine and module, in accordance with certain example embodiments.

In example embodiments, the network computing devices and any other computing machines associated with the technology presented herein may be any type of computing machine such as, but not limited to, those discussed in more detail with respect to FIG. 6. Furthermore, any modules associated with any of these computing machines, such as modules described herein or any other modules (scripts, web content, software, firmware, or hardware) associated with the technology presented herein may by any of the modules discussed in more detail with respect to FIG. 6. The computing machines discussed herein may communicate with one another as well as other computer machines or communication systems over one or more networks, such as network 120. The network 120 may include any type of data or communications network, including any of the network technology discussed with respect to FIG. 6.

Example Processes

Figure 3:
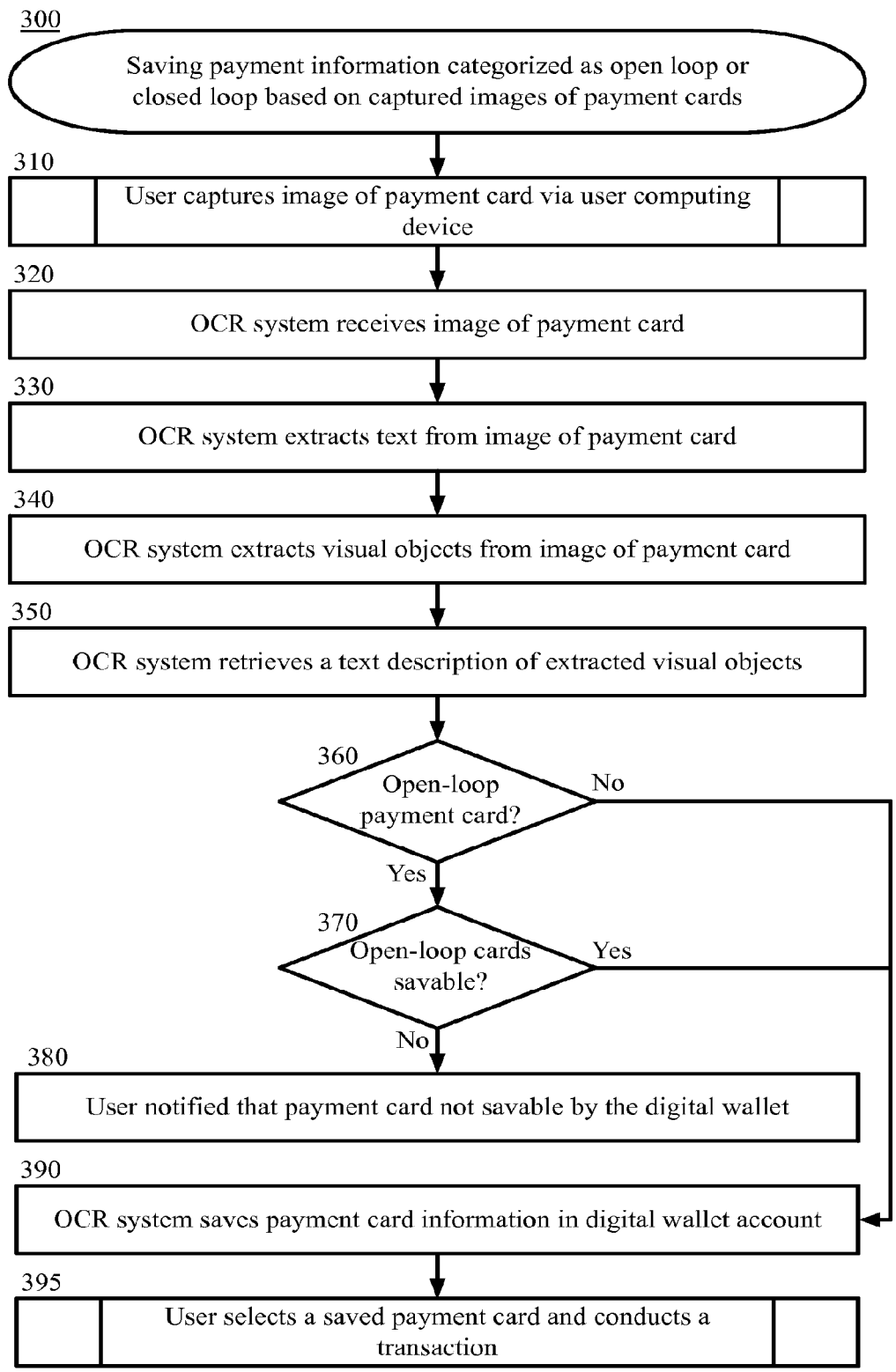
FIG. 3 is a block flow diagram depicting a method for saving payment information categorized as open-loop or closed-loop based on a captured image of a payment card, in accordance with certain example embodiments.
Figure 4:
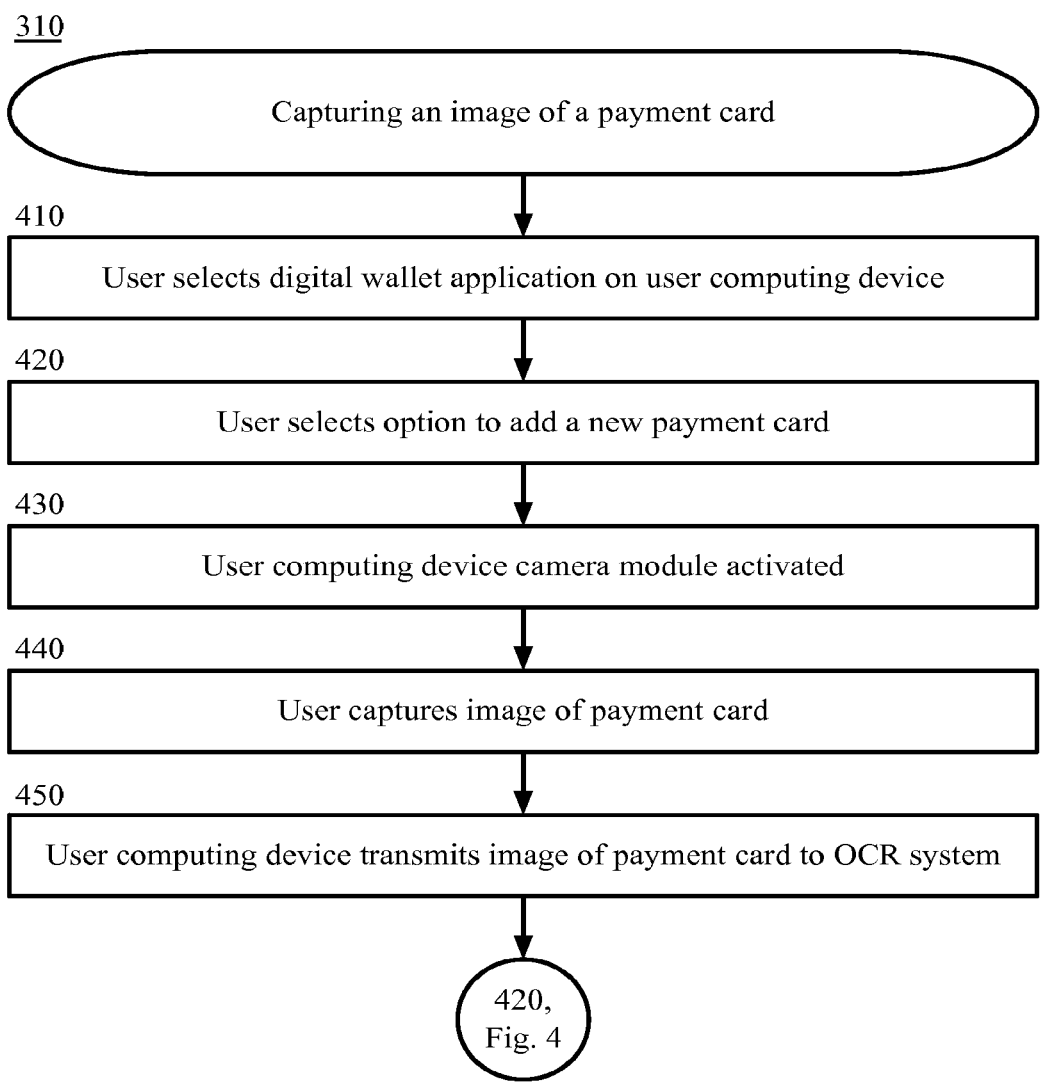
FIG. 4 is a block flow diagram depicting a method for capturing an image of a payment card, in accordance with certain example embodiments.
Figure 5:
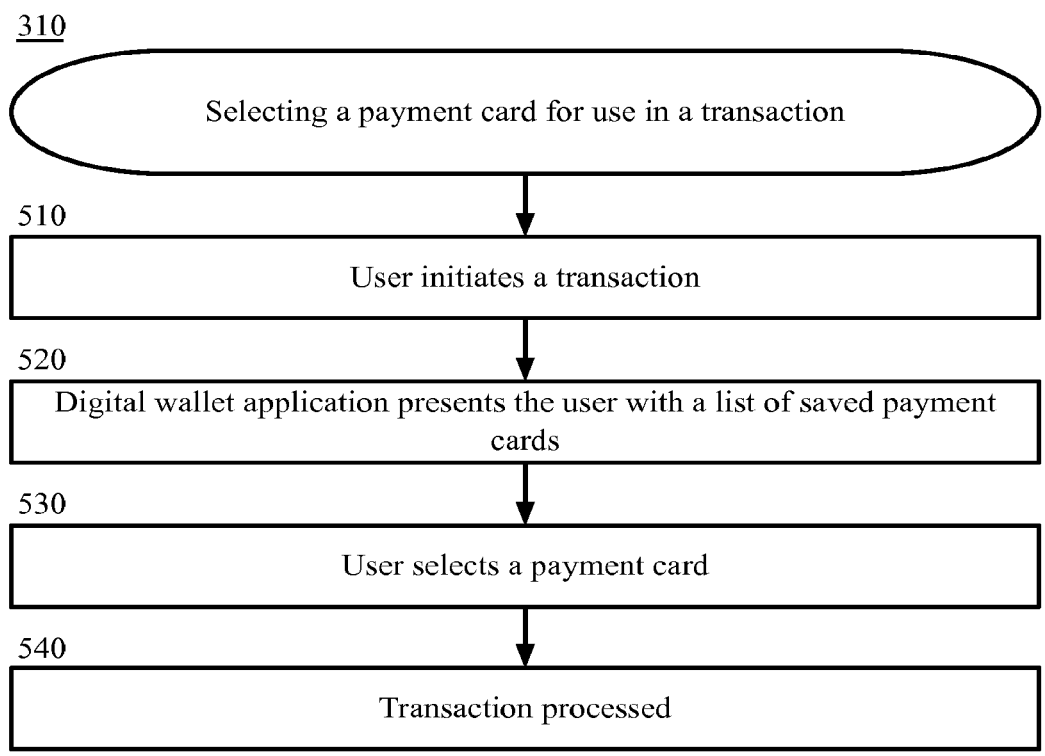
FIG. 5 is a block flow diagram depicting a method for selecting a payment card for use in a transaction, in accordance with certain example embodiments.

The example methods illustrated in FIGS. 3-5 are described hereinafter with respect to the components of the example operating environment 100. The example methods of FIGS. 3-5 may also be performed with other systems and in other environments.

FIG. 3 is a block diagram depicting a method 300 for saving payment information categorized as open-loop or closed-loop based on a captured image of a payment card, in accordance with certain example embodiments. The method 300 is described with reference to the components illustrated in FIG. 1.

In block 310, a user captures an image of a payment card 130 via a user computing device 110.

The method for capturing an image of a payment card 130 is described in more detail hereinafter with reference to the method described in FIG. 4.

FIG. 4 is a block diagram depicting a method 310 for capturing an image of a payment card 130, in accordance with certain example embodiments. The method 410 is described with reference to the components illustrated in FIG. 1.

In block 410, the user selects the digital wallet application 119 on the user computing device 110. In an example embodiment, the digital wallet application 119 stores financial account information or has access to financial account information stored in the user computing device data storage unit 115. In an example embodiment, the digital wallet application 119 is associated with a payment processing system (not shown). In this example embodiment, the user establishes a digital wallet account with the payment processing system and the payment processing system communicates with the digital wallet application 119 over a network 120. The user may download the digital wallet application 119 onto the user computing device 110 from a website associated with the payment processing system after establishing the digital wallet account with the payment processing system. In the example embodiment, the user may add, delete, or edit personal information and/or financial account information via the digital wallet application 119, which communicates with the payment processing system.

In block 420, the user selects an option to add a new payment card 130. In an example embodiment, the digital wallet application 119 presents one or more objects on the user interface 111 of the user computing device 110 that enable the user to add, edit, organize, delete, or perform some other appropriate function with information in the user's digital wallet account. In an example embodiment, the user selects an option to add a new payment card 130 by capturing an image of the payment card. For example, the user actuates an object on the user interface 111 on the user computing device 110 to select an option that reads "add a new payment card by taking a picture."

In block 430, the user computing device camera module 113 is activated. In an example embodiment, the digital wallet application 119 communicates with the camera module 113 and/or the user computing device 110 operating system to activate the camera module 113. In an example embodiment, the camera device that communicates with the user computing device 110 is activated. In this example embodiment, the user computing device 110 may communicate with the camera device via a network 120. In another example embodiment, the user activates the camera module 113 or the camera device. In yet another example embodiment, the user does not activate the camera module 113 at this time, but has previously captured one or more images of a payment card 130 using the user computing device 110, wherein the user computing device 110 saved the one or more images on the data storage unit 115. In this example embodiment, the user selects the saved one or more images of the payment card 130 to add the new payment card 130 to the digital wallet application 119.

In block 440, the user captures an image of the payment card 130. In this example embodiment, the user may capture an image of the front of the payment card 130, an image of the back of the payment card 130, or one or more images of the front and/or the back of the payment card 130. In this example embodiment, the "front" of the payment card 130 may be identified as the side of the payment card 130 that lists the account number and/or a user's name on the payment card 130. In another example embodiment, the user does not capture an image of the payment card 130 at this time, but instead accesses a previously captured image of the payment card 130. For example, the camera module 113, digital wallet application 119, or user computing device 110 are used by the user to access one or more images of the payment card 130 saved in the data storage unit 115 resident on the user computing device 110. In the example embodiments described herein, a payment card 130 may comprise a credit card, a debit card, a stored value card, a gift card, a coupon, a voucher card, a rewards points card, a loyalty card, or other payment card 130 appropriate for use in a transaction. In this example, a transaction may comprise the purchase, exchange, return, or redemption of goods or services and may comprise transfers of funds, credits, points, or any other appropriate unit of value to or from a user financial account associated with the payment card 130.

In block 450, the user computing device 110 transmits the image of the payment card 130 to the OCR system 140. The optical character recognition ("OCR") system 140 may comprise an OCR system application module 143 that is capable of recognizing text and visual objects in an image. In another example embodiment, the user computing device 110 transmits two or more images of the payment card 130 to the OCR system 140. In an example embodiment, the user computing device 110 transmits one or more images of the payment card 130 over the network 120. In an example embodiment, the user computing device 110 transmits the one or more images of the payment card 130 to a payment processing system that comprises the OCR system 140. In an example embodiment, the user computing device 110, in addition to transmitting the one or more images of the payment card to the OCR system 140, also saves one or more copies of the one or more images of the payment card 130 in the data storage unit 115 resident on the user computing device 110. In another example embodiment, the user computing device 110 does not transmit the payment card image to the OCR system 140 and actions described herein as being performed by the OCR system 140 or OCR system application module 143 are performed by the digital wallet application 119 and/or the user computing device 110.

Returning to FIG. 3, in block 320, the OCR system 140 receives the image of the payment card 130. In an example embodiment, the OCR system 140 receives the image of the payment card 130 at the OCR system application module 143 via the network 120. In another example embodiment, the OCR system 140 otherwise receives the one or more images of the payment card 130.

In block 330, the OCR system 140 extracts text from the image of the payment card 130. In an example embodiment, the OCR system application module 143 extracts the text from the image of the payment card 130. In another example embodiment, the OCR system application module 143 extracts texts from two or more images of the payment card 130. In an example embodiment, the OCR system application module 143 applies an optical character recognition ("OCR") algorithm to the payment card image to identify the information on the payment card. The OCR algorithm may represent any suitable process, program, method, or other manner of recognizing the digits or characters represented on the payment card image. In an example embodiment, the OCR algorithm may be customized to look for characters in particular locations on the image of the payment card 130, to look for a certain number of characters, or to look for certain combinations of characters. For example, it may be an industry standard for certain types of payment cards 130 to comprise a 15 or 16 numerical digit user account number in a certain location on the payment card 130, the user's name on a certain location on the payment card 130, and/or the expiration date of the payment card 130 on a certain location on the payment card. In an example, an expiration date may be in MM/DD/YYYY, MM/DD/YY, MM/YY, or MM/YYYY format, M representing a number associated with a month, D representing a number associated with a numerical day, and Y representing a number associated with a year. In an example embodiment, the OCR system application module 143 identifies each character and categorizes the groups of characters. For example, the OCR system application module 143 may determine that a group of characters comprise a name, account number, expiration date, and other suitable categories of data.

In block 340, the OCR system 140 extracts visual objects from the image of the payment card 130. In an example embodiment, the OCR system application module 143 extracts the visual objects from the image of the payment card 130. The OCR system application module 143 may use any suitable algorithm, process, method, or other manner of recognizing card images. For example, the OCR system application module 143 may isolate visual objects, such as card art, within the image of the payment card 130 and can compare the visual object images to a stored database of images to identify matching images. For example, the payment card 130 may comprise a logo of a merchant system, issuer system, acquirer system, or financial institution associated the payment card 130. In addition to visual objects, the OCR system application module 143 may extract features of the payment card image, such as color, brightness, pattern, lines, shapes, shading, a holographic nature of an object, and/or other appropriate or relevant features of the payment card image.

In block 350, the OCR system 140 retrieves a text description of extracted visual objects. In an example embodiment, when the OCR system 140 or OCR system application module 143 compares the identified visual object to a database of images and locates a matching image, the OCR system 140 accesses stored data associated with the matching image comprising a text description of the visual object. In this example embodiment, the database of images may be resident on the data storage unit 145 of the OCR system application module 143. The data stored with the matching images may comprise an identification of the payment card 130 type. For example, the OCR system 140 may identify a logo on the payment card image that matches a logo in the database and retrieve a text description from the database that identifies the logo as pertaining to a particular bank, merchant system, issuer system, acquirer system, or other appropriate system associated with the payment card 130. An example text description of a visual object or logo may comprise the bank, merchant, issuer, or acquirer name. The text description may also comprise a specific type of payment card 130, such as credit card, gift card, or debit card. In an example embodiment, the OCR system 140 may populate the database with visual object images associated with a plurality of common payment card formats and create and associate text descriptions with these the visual object images. In certain example embodiments, the database of images may directly associate or otherwise correlate an image with the relevant information, in which case the text transition step may not be needed.

In block 360, the OCR system 140 determines, based on the text description of extracted visual objects and text extracted from the image of the payment card 130 or otherwise associated therewith, whether the payment card 130 is an open-loop payment card or a closed-loop payment card. In the example embodiments described herein, an open-loop payment card comprises a payment card 130 that can be used in transactions with more than one merchant system, and a closed-loop payment card 130 comprises a payment card 130 that can only be used in transactions with a specific merchant system associated with the payment card 130. For example, credit cards and debit cards are open-loop payment cards 130 as they can be used in transactions with multiple merchant systems. In this example, a universal gift card is an open-loop payment card, whereas a merchant-specific gift card is a closed-loop payment card.

Figure 2:
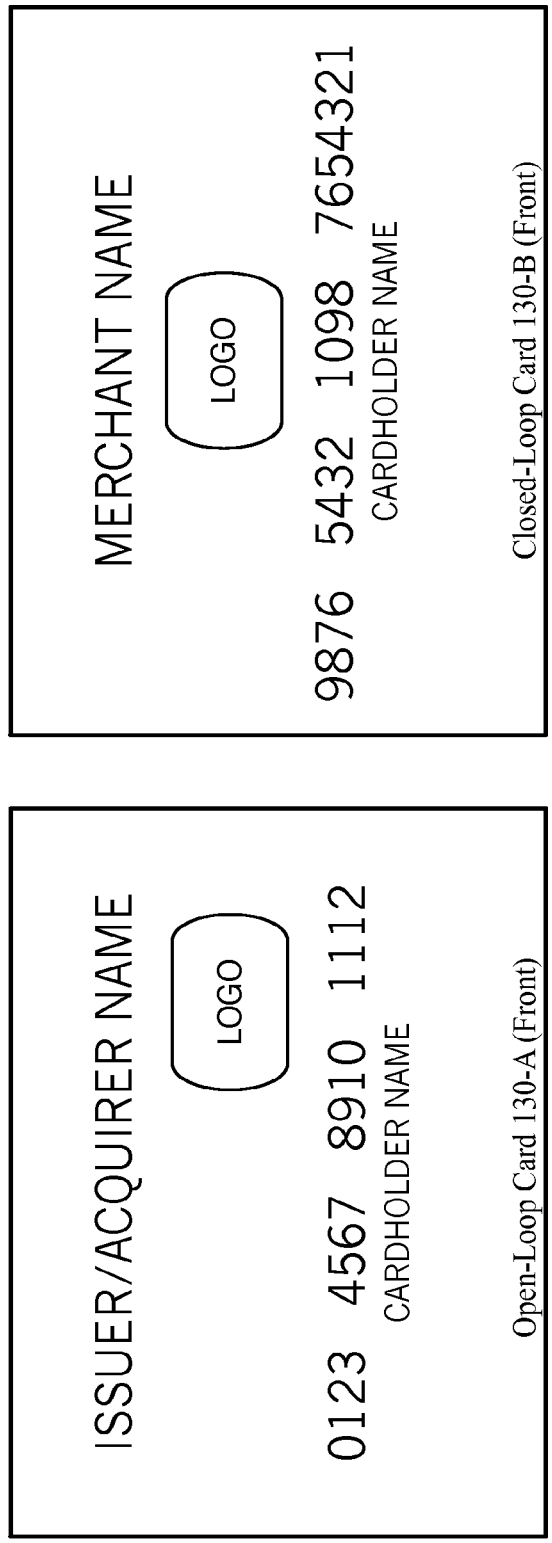
FIG. 2 is an example illustration of an open-loop payment card and a closed-loop payment card, in accordance with certain example embodiments.

FIG. 2 is an example illustration of an example open-loop card 130-A and closed-loop card 130-B, in accordance with certain example embodiments. The purpose of this illustration is to illustrate example methods of identifying differences between open-loop cards 130-A and closed-loop cards 130-B. Open-loop cards 130-A and/or closed-loop cards 130-B may be of a variety of formats. For example, an example open-loop card 130-A may comprise an issuer system name or acquirer system name listed on the front of the payment card 130, while a closed-loop card may list the name of the merchant system to which the payment card 130 is associated. Another example difference is that the positioning of a logo on an open-loop card 130-A may be standardized in the payment card 130 industry, thus facilitating an identification of a closed-loop card 130-B based on nonstandard logo positioning. In yet another example, an OCR system 140 may identify an open-loop card 130-A or closed-loop card 130-B based on the number of digits on an account number displayed on an image of the payment card 130. Other features of payment cards 130 (and their resulting captured images), such as color, shape, pattern, lines, shading, brightness, or other optically distinguishable features, may also be applicable in distinguishing between open-loop and closed-loop payment cards 130. In an example embodiment, the OCR system 140 extracts one or more of these features and compares the features to a database of features/card types to determine whether the payment card 130 is an open-loop or closed-loop payment card 130. For example, certain features, such as logos associated with merchant systems, issuer systems, or banking systems, may be associated with open-loop or closed-loop payment cards 130. For example, a bank-issued debit payment card 130 is an open-loop card and not a closed-loop card. In an example embodiment, the bank-issued debit payment card 130 comprises a logo feature associated with the issuing bank. In this example embodiment, the OCR system 140 detects the logo associated with the issuing bank and classifies the payment card 130 as not closed-loop based on the logo. In an example embodiment, a merchant system is more likely to issue a closed-loop card that is only usable with the merchant system. For example, the merchant system issues a gift card comprising a merchant logo feature. In this example, the OCR system 140 detects the merchant logo and classifies the gift card as a closed-loop gift card based on the merchant logo.

Returning to block 360, in FIG. 3, if the OCR system 140 determines that the payment card 130 is a closed-loop payment card 130, the method 300 proceeds to block 390. In an example embodiment, the OCR system 140 determines that the payment card is a closed-loop payment card 130 based on the identified visual objects in the payment card image, extracted text from the visual card image, regions of color, shape, pattern, lines, shading, or brightness on the payment card 130, and/or other appropriate features of the payment card 130 that can be optically detected by the OCR system 140. For example, a closed-loop payment card 130 may be identified based on the presence of a merchant name on the payment card image. In another example, a logo of a certain color, shape, and shading is detected in a certain position on the payment card 130 is searched in the OCR system application module 143 database and determined that the payment card 130 is a merchant gift card and thus a closed-loop payment card 130.

In block 390, the OCR system 140 saves payment card 130 information in the digital wallet account. In an example embodiment, the OCR system 140 communicates with the payment processing system associated with the digital wallet application to save the payment card information in the digital wallet account on the payment processing system and/or the digital wallet application on the user computing device 110. In an example embodiment, the OCR system 140 is part of the payment processing system. In an example embodiment, the OCR system 140 transmits the payment card information captured from the card image to the digital wallet application module 119 on the user computing device 110. Example payment card information may comprise a user's name (as it appears on the payment card 130), a financial account number extracted from the payment card 130, an expiration date associated with the payment card 130, an image of the payment card 130, and any other useful or appropriate information associated with the payment card 130 or the user's financial account.

Returning to block 360, if the OCR system 140 determines that the payment card is an open-loop payment card, the method 300 proceeds to block 370. In an example embodiment, the OCR system 140 determines that the payment card is an open-loop payment card 130 based on the identified visual objects in the payment card image, extracted text from the visual card image, regions of color, shape, pattern, lines, shading, or brightness on the payment card 130, and/or other appropriate features of the payment card 130 that can be optically detected by the OCR system 140. For example, the OCR system 140 may identify a payment card 130 as an open-loop payment card 130 based on the presence of an issuer system name, acquirer system name, and/or financial institution system name on the payment card image. For example, the OCR system 140 extracts text from the payment card 130 image. In this example, the OCR system 140 accesses a database comprising payment card 130 features such as logos, color schemes, and text associated with known payment card 130. In this example, the OCR system 140 searches the database for text that matches the extracted text and determines that the extracted text matches an issuer system name, acquirer system name, and/or financial institution system name in the database. In this example, the OCR system 140 determines the card type as open-loop or closed-loop based on the information in the database. For example, the OCR system 140 classifies a payment card 130 comprising text that matches an issuer system name in the database as an open-loop payment card. In another example, the database comprises a card type (open-loop or closed-loop) associated with the issuer system name, acquirer system name, and/or financial institution system name and the OCR system 140 determines classifies the payment card 130 according to the card type listed in the database associated with the extracted text.

In another example, the OCR system 140 detects a logo of a certain color, shape, and shading in a certain position on the payment card 130 and searches a database on the OCR system application module 143 for a text description of the logo. In this example embodiment, the OCR system 140 may determine that the payment card 130 is a credit card, debit card, or universal gift card, and thus an open-loop payment card 130. For example, the text description comprises an issuer system or financial institution system name. In this example, the OCR system 140 determines that the payment card 130 should be classified as open-loop based on the presence of an issuer system or financial institution system name in the text description of the logo. In an example embodiment, the database comprises a payment card 130 type associated with the text description of the logo and the OCR system 140 determines the payment card 130 classification as open-loop or closed-loop based on the payment card 130 type associated with the text description.

In block 370, the OCR system 140 determines whether open-loop payment cards are savable in the digital wallet account. In another example embodiment, the OCR system 140 communicates with the payment processing system associated with the digital wallet account to determine if open-loop cards are savable in the digital wallet account. In certain example embodiments, the digital wall et account is configured not to accept open-loop payment cards 130 due to security concerns or due to rules agreed upon between the OCR system and an issuer system, merchant system, or acquirer system associated with the payment card 130. For example, the digital wallet account and associated digital wallet application 119 may only be configured to accept one-merchant gift cards. In another example embodiment, open-loop payment cards are savable in the digital wallet account, but the account number and/or other important user financial account information associated with the payment card 130 must be blurred or obscured if displayed on the user computing device 110.

If the OCR system determines that open-loop payment cards are not savable, the method 300 proceeds to block 380.

In block 380, the user is notified that the payment card is not savable on the digital wallet. For example, the OCR system 140 transmits a notification to the user computing device 110 that the open-loop payment card type can not be saved on the digital wallet account. In this example, the user computing device 110 displays the notification. An example notification may read "We're sorry. Credit/debit cards can not be saved by this application." In an example embodiment, the OCR system 140 deletes any extracted financial account information extracted from the open-loop payment card 130 and any images of the open-loop payment card 130. In another example embodiment, the OCR system 140 uses a redacted image of the open-loop payment card 130 to train a computer model to identify similar open-loop payment cards 130 in the future. In another example embodiment, open-loop payment cards 130 are not savable in the digital wallet account or associated digital wallet application 119, but are savable in an alternative digital wallet account and associated digital wallet application 119 resident on the user computing device 110 and appropriate for saving open-loop payment cards 130. In this example embodiment, the OCR system 140 may transmit the financial account information and image of an identified open-loop payment card 130 to the alternative digital wallet account. In this example embodiment, the OCR system 140 may transmit a request to the user computing device 110 alerting the user that the payment card 130 may not be stored in the digital wallet account and asking user permission to store the payment card 130 information in an alternative digital wallet account. In this example embodiment, if the user consents, the payment information is saved by the alternative digital wallet application 119, and if the user does not consent, the financial account information and associated payment card 130 image are deleted by the OCR system 140 or used for other purposes as previously discussed. In this example embodiment, the user may also be given the option to change the settings of the digital wallet account and associated digital wallet application 119 to allow saving of open-loop cards. In this example embodiment, if the user changes the digital wallet account settings, the open-loop payment card 130 may be saved in the digital wallet account.

Returning to block 370, if the OCR system 140 determines that open-loop payment cards are savable, the method 300 proceeds to block 390.

In block 390, the OCR system 140 saves payment card information in the digital wallet account. In an example embodiment, the OCR system 140 communicates with the payment processing system associated with the digital wallet application to save the payment card information in the digital wallet account on the payment processing system and/or the digital wallet application on the user computing device 110. In an example embodiment, the OCR system 140 is part of the payment processing system. In an example embodiment, the OCR system 140 transmits the payment card information to the digital wallet application module 119 on the user computing device 110. Example payment card information may comprise a user's name (as it appears on the payment card 130), a financial account number extracted from the payment card 130, an expiration date associated with the payment card 130, an image of the payment card 130, and any other useful or appropriate information associated with the payment card 130 or the user's financial account.

In block 395, the user selects a saved payment card and conducts a transaction. The method for selecting a payment card 130 for use in a transaction is described in more detail hereinafter with reference to the method described in FIG. 5.

FIG. 5 is a block diagram depicting a method 395 to select a payment card to use for a digital wallet transaction, in accordance with certain example embodiments. The method 390 is described with reference to the components illustrated in FIG. 1.

In block 510, the user initiates a transaction. In an example embodiment, the user desires to initiate a peer to peer ("P2P") transaction with another user having a digital wallet account with the payment processing system. In an example embodiment, the user selects the digital wallet application 119 on the user computing device 110. In this example embodiment, the user selects an option to initiate a P2P transaction using the digital wallet account. In an example, the user actuates one or more objects on the user interface 111 to initiate the P2P transaction. An example P2P transaction comprises a transfer of funds from the user to a payee. In an example embodiment, the user selects a payee for the P2P transaction via the digital wallet application 119. In other example embodiments, the user initiates a digital wallet transaction with a merchant system. For example, the user accesses a merchant system website via a web browser on the user computing device 110, selects one or more items for purchase, and initiates a transaction on the merchant system website by actuating an object on the user interface 111.

In block 520, the digital wallet application 119 presents the user with a list of saved payment cards 130. In an example embodiment, the digital wallet application 119 is associated with a payment processing system comprising a digital wallet account associated with the user. In an example embodiment, the digital wallet application 119 communicates with the payment processing system to access financial account information stored in the digital wallet account. In an example embodiment, the digital wallet application 119 stores financial account information associated with one or more payment cards 150 in the data storage unit 115 of the user computing device 110. In the example embodiments described herein, a payment card 130 may comprise a credit card, a debit card, a stored value card, a gift card, a coupon, a voucher card, a rewards points card, a loyalty card, or other payment card 130 appropriate for use in a transaction.

In block 530, the user selects a payment card 130. In an example embodiment, the user actuates an object on the user interface 111 to select the payment card 130 from one or more payment cards stored in the user's digital wallet account. For example, the user 101 selects a debit card from the list of payment cards 130. In another example, the user 101 selects a credit card from the list of payment cards 130. In an example embodiment, the payment processing system 150 receives notification of the user selection of the payment card and retrieves financial account information associated with the payment card selected by the user for use in the payment transaction. For example, the financial account information is stored in the user's digital wallet account.

In block 540, the transaction is processed. In an example embodiment, the payment processing system associated with the digital wallet account and the digital wallet application 119 processes a P2P transaction based on the financial account information associated with the credit payment card 130. In an example embodiment, the transaction comprises a transfer of funds to or from a user financial account associated with the payment card 130. For example, a P2P transaction involves the transfer of funds between the user financial account and a second user financial account of another user having a digital wallet account associated with the payment processing system. In another example, the transaction comprises a transfer of funds between the user financial account associated with the payment card 130 and a merchant system account. In another example embodiment, the payment processing system or a merchant system process a transaction between the user and an online website using the financial account information associated with the credit payment card 130.

Other Example Embodiments

FIG. 6 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of all of or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to categorize payment cards, comprising:
    receiving, using one or more computing devices and from a user computing device, an image comprising an image of a payment card;
    extracting, using the one or more computing devices, one or more text objects and one or more visual objects from the image of the payment card;
    determining, using the one or more computing devices and based on the one or more extracted text objects and the one or more extracted visual objects, a categorical designation for the payment card and financial account information associated with the payment card; and
    transmitting, using the one or more computing devices and to the user computing device, the financial account information associated with the payment card and the categorical designation for the payment card for storage in the user computing device based on the categorical designation.

2. The method of claim 1, wherein the categorical designation comprises one of an open-loop payment card and a closed-loop payment card.

3. The method of claim 2, wherein the user computing device discards the received financial account information associated with the payment card if the payment card has a categorical designation comprising an open-loop payment card.

4. The method of claim 1, wherein the user computing device discards the received financial account information based on the categorical designation.

5. The method of claim 1, wherein a user computing device captures the image of the payment card and transmits the image of the payment card to the one or more computing devices.

6. The method of claim 1, wherein the user computing device captures the image of the payment card via a camera device communicating with the user computing device via a network and transmits the image of the payment card to the one or more computing devices.

7. The method of claim 1, wherein the user computing device initiates a transaction using the saved financial account information associated with the payment card.

8. The method of claim 1, wherein one or more of the one or more extracted visual objects comprise a logo associated with an issuer system, an acquirer system, or a financial institution system.

9. A computer program product, comprising:
    a non-transitory computer-readable storage device having computer-readable program instructions embodied thereon that when executed by a computer cause the computer to categorize payment cards, the computer-readable instructions comprising:
        computer-readable program instructions to extract one or more text objects and one or more visual objects from an image of a payment card;
        computer-readable program instructions to determine, based on the one or more extracted text objects and the one or more extracted visual objects, a categorical designation for the payment card and financial account information associated with the payment card; and
        computer-readable program instructions to transmit, to a user computing device, the financial account information associated with the payment card and the categorical designation for the payment card for storage in the user computing device based on the categorical designation.

10. The computer program product of claim 9, wherein the categorical designation comprises one of an open-loop payment card and a closed-loop payment card.

11. The computer program product of claim 10, wherein the user computing device discards the received financial account information associated with the payment card if the payment card has a categorical designation comprising an open-loop payment card.

12. The computer program product of claim 9, wherein the user computing device discards the received financial account information based on the categorical designation.

13. The computer program product of claim 9, wherein the user computing device captures the image of the payment card via a camera device communicating with the user computing device via a network.

14. The computer program product of claim 9, wherein one or more of the one or more extracted visual objects comprise a logo associated with an issuer system, an acquirer system, or a financial institution system.

15. A system to categorize payment cards, comprising:
    a storage device; and a processor communicatively coupled to the storage device, wherein the processor executes application code instructions that are stored in the storage device to cause the system to:
  receive, from a user computing device, an image comprising an image of a payment card captured via the user computing device;
  extract one or more text objects and one or more visual objects from the image of the payment card;
  determine, based on the one or more extracted text objects and the one or more extracted visual objects, a categorical designation for the payment card and financial account information associated with the payment card; and
  transmit, to the user computing device, the financial account information associated with the payment card and the categorical designation for the payment card for storage in the user computing device based on the categorical designation.

16. The system of claim 15, wherein the categorical designation comprises one of an open-loop payment card or a closed-loop payment card.

17. The system of claim 15, wherein the user computing device discards the received financial account information based on the categorical designation.

18. The system of claim 17, wherein the user computing device discards the received financial account information associated with the payment card if the payment card has a categorical designation comprising an open-loop payment card.

19. The system of claim 15, wherein the user computing device captures the image of the payment card via a camera device communicating with the user computing device via a network.

20. The system of claim 15, wherein one or more of the one or more extracted visual objects comprise a logo associated with an issuer system, an acquirer system, or a financial institution system.

* * * * *